June 21, 1966 J. W. JANSEN ETAL 3,256,946
HAMMER DRILL
Filed May 14, 1963 2 Sheets-Sheet 1
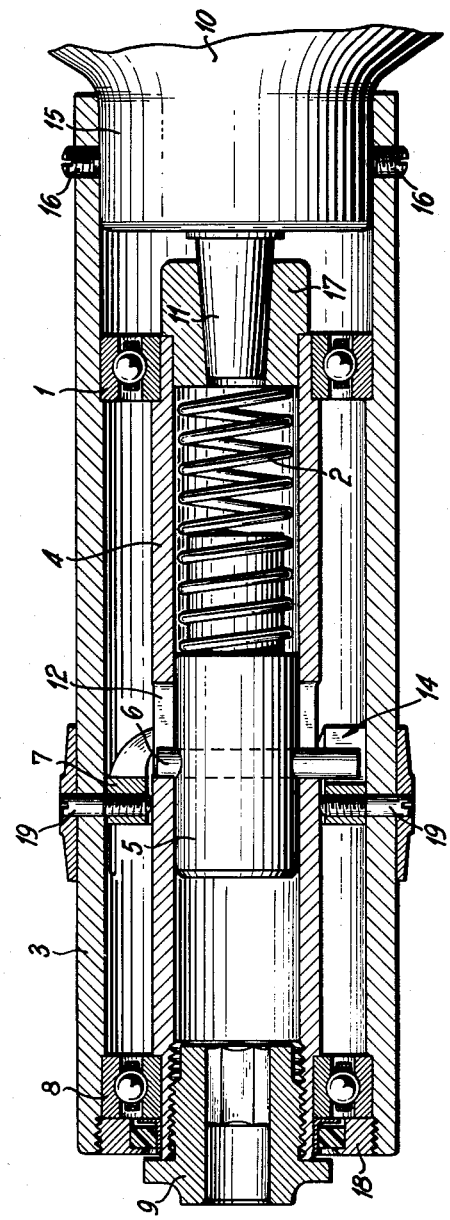
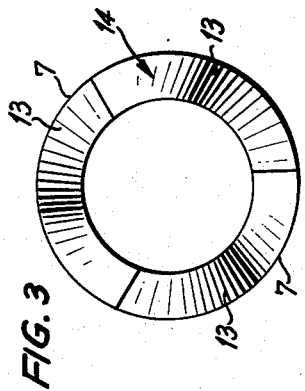
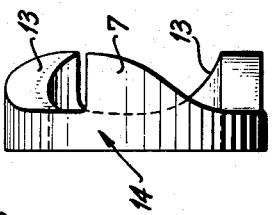
INVENTORS
Johann Wilhelm Jansen
and Hendrik Hoffmann
by Michael S. Striker
Attorney

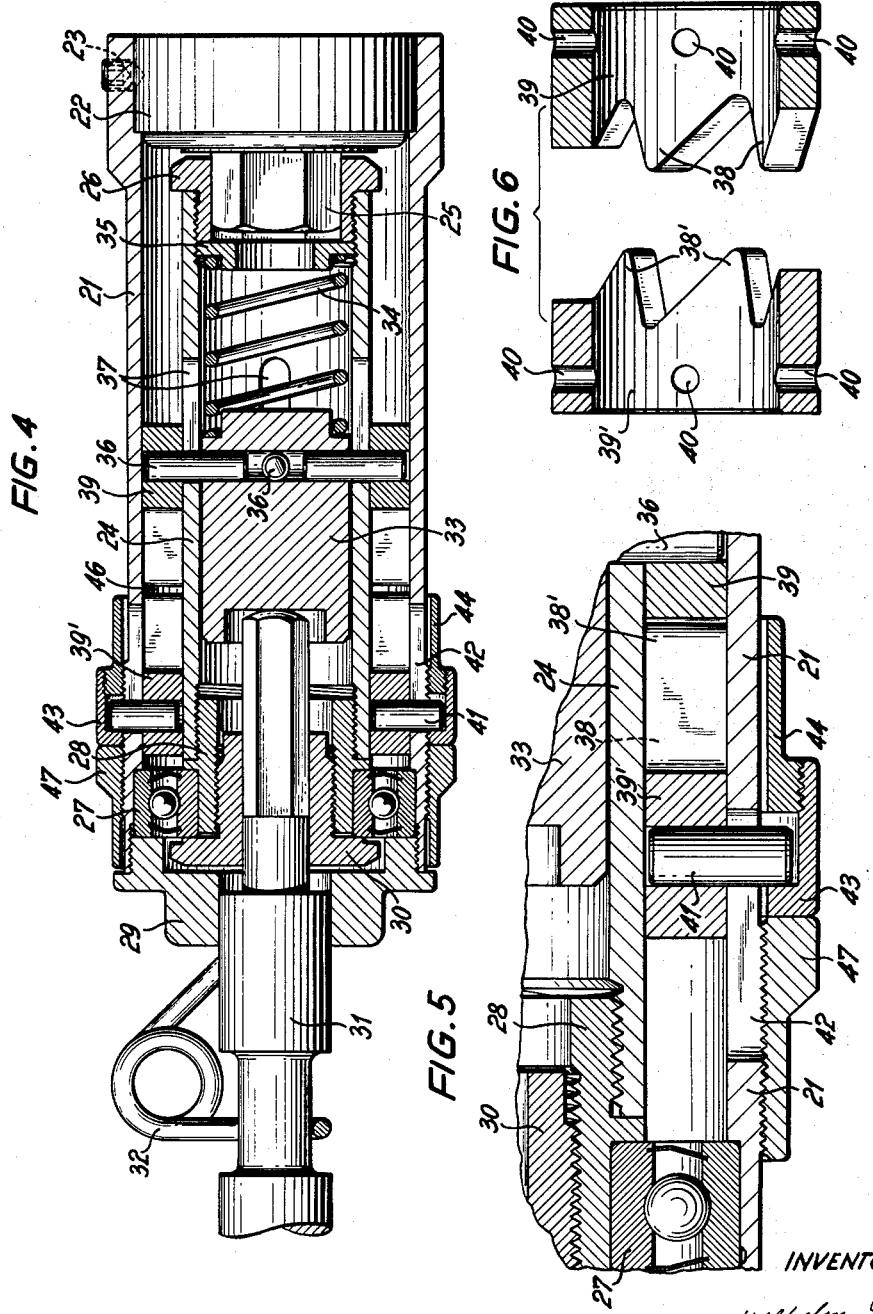

… … …  
United States Patent Office 3,256,946  
Patented June 21, 1966

3,256,946  
HAMMER DRILL  
Johann Wilhelm Jansen, Hilversum, and Hendrik Hoffmann, Amsterdam, Netherlands, assignors, by mesne assignments, to Naamloze Vennootschap Huygmetaal, Hilversum, Netherlands  
Filed May 14, 1963, Ser. No. 280,404  
Claims priority, application Netherlands, May 14, 1962, 278,397  
6 Claims. (Cl. 173—97)

The invention relates to hammer drill with a motor and a hollow shaft in which a striker hammer is arranged to move freely up and down and which has a controlling element which cooperates with a stationary control cam.

In practice the problem of producing a hole in concrete, stone or similar material frequently arises. To solve this problem various types of hammer drills or similar devices have already been proposed. In these devices it is not only known to vary the striking force by employing a circular plate with tooth-like projections about 3 millimeters in height, but devices are known in which the height of the blow can be adjusted in two to four stages. In general the following may be said.

In the known devices a drilling spindle is mounted so that it is axially stationary. For breaking up the material in the drill hole an axially movable hammer is accommodated in the housing of the machine, which hammer is projected directly against the drilling tool by a toothed rim or cam-shaped element either freely or against an initially tensioned spring. The machine is always in a state of equilibrium internally so that the pre-tensioned hammer on reaching its highest position can give up its accumulated energy directly to the drilling tool by free fall.

Drill holes in concrete or stone are not produced by a cutting movement, like for example the bore holes in steel, but by the old method of punching with a chisel which disintegrates the material in the hole. Percussion or vibration drilling machines are known in which toothed-rim-like removing devices are provided which effect an alteration in the length of the machine corresponding to the height of the teeth of the toothed rim element. The height as well as the angle of inclination of the hobbing or sliding tooth in combination with the number of revolutions performed by the machine determines the period of evolution of a blow or, more precisely, the oscillatory impulse which must be caused to act on the drilling tool on the one hand by the inertia of the machine and on the other hand by the amount of the drilling pressure or thrust.

It has been found in practice that the efficiency of such forms of construction is extremely slight. Moreover, the speed of rotation is braked by too heavy pressure and consequently the number of oscillations is reduced. Furthermore, considerable frictional forces are formed and consequently a great deal of wear takes place between the toothed rims rolling on each other. Moreover, the winding of the motor or of the stator can become overloaded. As a rule the above-mentioned pressure has a detrimental effect on the drilling performance and also on the user of the tool.

The object of the invention is to further improve hammer drills of the type described at the outset so that particularly the objections described as being present in the known forms of construction, are overcome.

To attain this object the invention provides a hammer drill comprising a motor, a hollow shaft driven by said motor, a striker hammer freely movable up and down in said hollow shaft and a controlling device consisting of at least one controlling element mounted in said striker hammer and cooperating with at least one stationary cam, said hollow shaft having at least one slot through which at least one end of said controlling element passes to cooperate with said stationary cam to produce the longitudinal movement of the striker hammer and couple the striker hammer with the hollow shaft for rotation therewith.

The hammer drill as proposed by the invention is based on the principle that blows are imparted directly on to the drilling tool so as to achieve quicker and more complete disintegration of the material of the bore hole without the exertion of pressure or a pressing force being necessary. Rather the striker hammer of the hammer drill carries out a free drop with the result that the full force of the blow is directed on to the drilling tool. As a result the objections mentioned at the outset in connection with the known forms of construction of machines of this type in which the work is carried out with contact pressure, are overcome.

It is advisable to subject the striker hammer arranged within the hollow shaft to the action of a spring. The striker hammer may have a transverse bore in which a pin-like control element is arranged.

At least one control cam is preferably arranged on the inner side of the outer housing of the hammer drill and is preferably detachably connected therewith. This control cam has on its operative surface at least one ramp or lifting zone followed by at least one free-fall zone. It is evident that it is also possible to change the number of lifting or free-fall zones of a control cam, for example, in such a manner that during one revolution three blows are dealt on the drilling tool. To enable the hammer drill to be used if necessary exclusively as a drill, provision is made for cutting out the control cam. In this case the drill will carry out only a rotary movement in the usual manner.

In the case of the forms of constructions hitherto described, provision is made for the striker hammer to carry out a free-fall of more than 3 millimeters. Moreover, no variation of the striking effect has been provided. To enable adaptation to different conditions in practice, a second form of construction of the hammer drill is proposed by the invention in which, for producing the striking effect of the drilling tool, two control elements are used which are shiftable in relation to each other and have cooperating cogs. One of the two control elements is preferably constructed as a ring and provided with several bores in each of which the free end of a bearing pin engages. The bearing pins themselves each pass through a slot in the hollow shaft and their free ends are mounted in the striker hammer. A cross-like arrangement of four bearing pins in all is preferred. This means that two neighboring bearing pins always include an angle of 90°.

The second of the two control elements is also of ring shape. However, an adjusting device operative in axial direction is associated with this second ring. The adjusting device preferably consists of an adjusting ring which acts indirectly or directly on parts of other bearing pins projecting from the housing and each passing through a slot in the outer housing and mounted in the ring itself. At the same time it is preferable to construct the adjusting ring as a screw element cooperating with the housing and which acts on the bearing pins through the intermediary of a pressure ring. Detachably connected with the pressure ring is a cover ring which closes the slot in the housing when the control element is in its end position.

It has already been mentioned that the control elements are equipped with cogs. These are arranged on surfaces facing each other and preferably of the same shape. Their depth of engagement can be infinitely adjusted by means of the adjusting device mentioned. Provision is also made for bringing the cogs completely out of engagement to enable only a turning movement of the drill to be carried out, if required.

Further details of the invention will become apparent from the following detailed description.

Two preferred embodiments of the invention will now be described by way of example and with reference to the accompanying drawings, in which:

FIG. 1 is a longitudinal section through a hammer drill according to the invention constituting the first embodiment;

FIG. 2 is an elevational view of a control cam for the hammer drill according to FIG. 1;

FIG. 3 is a top plan view of the control cam according to FIG. 2;

FIG. 4 is a longitudinal section through a second embodiment of a hammer drill according to the invention;

FIG. 5 is a section, on a larger scale, showing a portion of the hammer drill according to FIG. 4 in the region of the adjustment of the height of the blow, and FIG. 6 is a longitudinal section through two control cams for use in connection with the hammer drill according to FIG. 4.

The hammer drill according to FIGS. 1 to 3 comprises a housing 3 consisting of a cylindrical body one free end of which engages over a bearing housing 15 of an electric motor 10. The connection between the housing 3 and the electric motor 10 is effected by screws 16 which engage in a thread in the housing 3 and are radially inserted to bear against the rotating wall surface of the bearing housing 15.

The housing 3 accommodates a hollow shaft 4 extending in the longitudinal direction thereof, which is rotatably mounted in the housing 3 in a ball bearing 1 at the end nearer the electric motor and in a second ball bearing 8 at the opposite end. The hollow shaft 4 is connected with the electric motor 10 through the intermediary of a shaft end projecting out of the bearing housing 15. This shaft end is, in the embodiment illustrated, constructed as a connecting cone 11. This connecting cone 11 cooperates with a hollow cone 17 which is fixed on the hollow shaft 4. The connection of these parts is effected in a known manner by pressfit. In this manner the rotary motion of the electric motor 10 is imparted to the hollow shaft 4.

A connecting piece 9 is coordinated with the free end of the hollow shaft 4 which terminates practically flush with the housing 3. The hollow shaft 4 and the connecting piece 9 are connected by a screw connection, the hollow shaft 4 having an internal screw thread and the connecting piece 9 an external screw thread. The connecting piece 9 is in the form of a sleeve and projects with the greater portion of its length into the hollow shaft 4 while the end projecting out of the hollow shaft 4 is widened in the form of a flange. The flange surface facing the hollow shaft 4 extends radially, while the other surface facing freely outwards forms an end face extending in the form of a channel to the protruding end face. The internal space of the connecting piece 9 is composed of two different zones, the zone pointing outwards being constructed as a cylindrical space while the zone pointing towards the interior of the hammer drill is of unround cross section or polygonal. The rotary hollow shaft 4 is dust-tight closed in relation to the stationary housing 3 by a sliding packing 18, the rigid portion of which is screwed into the housing 3 and the elastic and actual packing portion bears against the outer surface of the hollow shaft 4. By the parts of the hammer drill above-described only the rotary movement is transmitted to a drilling tool not shown in the drawing but which is carried by the connecting piece 9 and held against rotation in the non-circular zone thereof.

The blows which are to be exerted on the drilling tool are produced by a striker hammer 5. This striker hammer 5 is mounted axially shiftable in the hollow shaft 4. For the purpose of this mounting, the striker hammer 5 has a cylindrical wall portion extending along the greater part of its length and corresponding substantially to the internal diameter of the hollow shaft 4, the minus tolerances serving for the movement being taken into consideration in a known manner. The striker hammer 5 has a narrowed zone which is encircled by parts of a pressure spring 2 which bears at one end against a shoulder of the striker hammer 5 formed by the difference in diameter and at its other end against the end face of the inner cone 17. The axial movement of the striker hammer 5 is limited in both directions by a control element 6. This control element 6 passes through the middle of the striker hammer 5 in radial direction and is mounted with two ends of different lengths in slots 12 arranged diametrically opposite each other in the wall of the hollow shaft 4. The striker hammer 5 is capable of longitudinal movement in the zone of the slots 12.

The different lengths of the two free ends of the control element 6 projecting out of the striker hammer 5 are so dimensioned that one end terminates already within the outer wall surface of the hollow shaft 4 while the other end is longer, passes out of the hollow shaft 4 and terminates at a short distance from the inner wall of the housing 3. This free end of the control element 6 projecting from the hollow shaft 4 bears with its radial outer wall against surfaces of a control cam 14 still to be described. In the embodiment illustrated, the contact is under pressure produced by the pretension of the pressure spring 2.

As can be seen particularly from FIGS. 2 and 3, run-on or lifting surfaces 7 and 13 are cut in axial direction out of the control cam 14 and so shaped that the front edge of one run-on or lifting surface rises in a gentle curve while the tail edge drops abruptly to the height of the root of another run-on or lifting surface 7, 13. The control cam 14 is, as shown in FIG. 1, fixed on the housing 3 yet detachable therefrom. In the preferred form of construction it is secured on the inner wall of the housing by screws 19.

As already mentioned, the striking effect is produced by the axial displacement of the striker hammer 5. It takes place on the drilling tool only when the end thereof projecting into the hammer drill is beyond the lowermost position of the striker hammer 5 so that the drilling tool is struck by the striker hammer 5 in any case. The movement of the striker hammer 5 is caused by the free end of the control element 6 which projects out of the hollow shaft 4 running on to the lifting surfaces of the control cam. This effects a displacement of the striker hammer 5 in the direction towards the spring 2 whereby this latter is compressed. On leaving the lifting surface 7, 13 the pretension of the spring 2 is released. This is rendered possible by the free end of the control element 6 dropping back freely into the lower situated zone of the run-on or lifting surfaces 7 and 13.

Another embodiment of a hammer drill is illustrated by way of example in FIGS. 4 to 6. This hammer drill differs from that above-described substantially by the possibility of regulating the height of drop of the striker hammer and consequently the striking effect. This enables the tool to be adapted to different conditions.

FIG. 4 shows a housing 21 which consists of a substantially cylindrical body and has at one end a thickened and widened portion in which a bearing housing 22 of an electric motor is accommodated. Shifting or turning movement of the bearing housing 22 is prevented by several screws 23 which engage in a screw-threaded hole in the thickened part of the housing 21 in radial direction and can be brought to bear against the bearing housing 22 of the motor. The housing 21 accommodates also a hollow shaft 24 extending in axial direction. In this case special ball bearings can be dispensed with. The end 25 of the motor shaft which projects freely from the bearing housing 22 and is of polygonal cross section is connected with the hollow shaft 24 through the intermediary of a sleeve 26. The bore of the sleeve 26 is of the same polygonal cross section as the free end of the motor shaft 25. The sleeve 26 is connected with the hollow shaft 24 by a screw thread connection. For this purpose part of the sleeve has an external thread which engages in an internal screw thread in the hollow shaft 24. A flange-like widened portion of the sleeve 26 bears against the end face of the hollow shaft 24.

At the other end of the hollow shaft 24 is carried by the housing 21 through the intermediary of a ball bearing 27. Whereas the ball bearing 27 is directly carried by the housing 21, the hollow shaft 24 is indirectly mounted therein by a double sleeve 28. This comprises a cylindrical part provided with an external screw thread which is screwed into an internal screw thread in the hollow shaft 24. The bearing against the end face of the hollow shaft 28 is effected by a collar of the double sleeve 28 not described in greater detail but one side of which forms a bearing surface for the end face of the hollow shaft 24 while the opposite side bears against the ball bearing 27. The inner race of the ball bearing 27 is carried by an extended second part of the double sleeve 28. Thus the hollow shaft 24 is carried in the housing 21 at one end by the motor and at the other end by the ball bearing 27. The ball bearing 27 is fixed by two further sleeves, namely a sleeve 29 rigidly connected with the housing 21 and a rotary sleeve 30 connected with the hollow shaft 24. The sleeve 29 bears against the radial surface of the outer race of the ball bearing 27. The sleeve 29 is provided with an external screw thread and screwed into an internal screw thread of the housing 21. The sleeve 30 is likewise provided with an external screw thread which engages in an internal screw thread in the double sleeve 28. Thus this sleeve is indirectly connected with the hollow shaft 24. The ball bearing 27 is also secured in position by a flange on the sleeve 30 which engages radially over the double sleeve 28 and bears against the inner race of the ball bearing 27.

As the sleeve 29 is stationary in relation to a rotary drilling tool 31, it is held in its recess so that the drilling tool 31 is only loosely guided. The actual guiding of the drilling tool 31 is left to the sleeve 30. For this purpose the sleeve 30, just as the connecting piece 9 according to FIG. 1, has a zone of cylindrical cross section and a zone of polygonal cross section, corresponding to the different shapes of the foot portion of the drilling tool 31. In this manner the drilling tool is guided on the one hand and the rotary movements are imparted to the hollow shaft by form-locking connection on the other hand. It must also be mentioned that a retaining spring 32 is associated with the housing 21 or the parts rigidly connected therewith and secures the drilling tool 31 against falling out, by its end gripping round a narrowed part.

The striking effect is produced in a similar manner to that described in connection with the first embodiment of the hammer drill. The hollow shaft 24 accommodates an axially freely movable striker hammer 33 which is of substantially cylindrical construction and has a diameter which corresponds to the inner space of the hollow shaft 24. The striker hammer 33 is provided at its end adjacent the drilling tool 31 with an aperture for receiving the foot end of the drilling tool. The other end of the striker hammer 33 is narrowed and serves as bearing for a spring 34 which at one end engages over the narrowed end of the striker hammer 33 and at the other end bears against an abutment 35 which holds the end of the spring radially and axially in an angular groove provided therefor. The abutment 35 bears against the inner end face of the sleeve 26. In this manner the striker hammer 33 is spring loaded in the direction towards the drilling tool holder.

For controlling the axial movement of the striker hammer 33 and at the same time its displacement against the pretension of the pressure spring 34, the striker hammer has four bearing pins 36 which are crossed at right angles and pass partly through similarly arranged elongated slots 37 in the hollow shaft 24. The lengths of the slots 37 limit the displacement of the striker hammer 33. The free ends of the bearing pins 36 are accommodated in a ring 39 provided with cogs 38 which together with the bearing pins 36 perform the duty of the control element 6 of FIG. 1. Such a ring 39 is shown in longitudinal section on the right of FIG. 6. In this figure two rings are illustrated one of which, namely the ring 39, is merely a ring which receives bearing pins 36, as already mentioned, whereas the other ring designated by 39', has an adjusting device which will be hereinafter described. The ring 39 is so mounted that its inner surface bears against the outer surface of the hollow shaft 24 and thus forms a lock against displacement in that the bearing pins 36 engage in bores 40 in the ring 39. In this manner the ring 39 is mechanically connected with the striker hammer 33 by the bearing pins 36. Thus the movements of the ring are transmitted to the striker hammer 33 and inversely the movements of the striker hammer 33 are transmitted to the ring 39.

The lifting of the striker hammer 33 or the shifting against the pretension of the spring 34 and consequently the building up a pretension in the spring is effected by the fact that the ring 39 runs off against the ring 39'. In the illustration the ring 39' is firmly mounted on the housing 21, whereby the term "firmly" only applies to the radial direction of rotation. Otherwise it can still carry out an axial movement. For this purpose the ring 39', also has four bores 40' each of the which serves as a bearing for one of pins 41. The pins 41 pass through slots 42 extending in longitudinal direction in the housing 21 and project with their free ends a distance beyond the outer wall surface thereof. The free projecting ends of the pins 41 are taken up by a pressure ring 43 which is of flange-like shape and bears at one end with its inner wall surface against the outer wall surface of the housing 21. The greater part of the inner wall surface forms a peripheral groove outwardly directed and accommodating the ends of the pins 41. In order to secure the pins 41 in the pressure ring 43 the groove in the pressure ring 43 is closed by a closing ring 44. The connection between the pressure ring 43 and the closing ring 44 is effected by providing the pressure ring 43 with an internal screw thread and the closing ring 44 with an external screw thread, the two screw threads cooperating in a known manner. In addition to the threaded portion, the closing ring has a sleeve-like zone which extends the closing ring in the direction towards the motor and serves primarily for covering the slots 42, in which the pins 41 move, also when the pressure ring 43 has assumed its extreme position. In the embodiment illustrated in FIG. 4, the pressure ring 43 and consequently the ring 39' with its cogs 38' is in its lowermost position. In this position the free ends of the cogs 38 and 38' of the rings 39 and 39' are not in cooperative position with each other and a gap 46 shown in FIG. 4 remains open. In this position no striking effect can be exerted on the inserted drilling tool 31 but this will merely be given a rotary movement. If it is desired to produce a striking effect the ring 39' must be moved towards the rotating ring 39. The displacement is effected by means of an adjusting ring 47 which is also of sleeve-like construction and has an internal screw thread. With the aid of this internal screw thread the adjusting ring 47 can be moved in axial direction on a portion of the housing 21 which is provided with a corresponding external screw thread. The displacement can be effected from the position shown in FIG. 4 to the position shown in FIG. 5. In FIG. 5 the adjusting ring 47 is almost fully extended in the direction towards the motor so that the maximum engagement of the cogs 38 and 38' of the rings 39 and 39' takes place. When the adjustment ring 47 is in this position, as shown in FIG. 5, almost the entire height of the cogs 38 and 38' will be utilized for producing the blows so that particularly heavy blows are obtained in this position. If, on the other hand, the intensity of the blows is to be reduced, the ring 39' is shifted to a greater or lesser degree away from the ring 39 so that the ring 39 is not lifted to much and will consequently have a correspondingly short depth of drop. In this manner an infinite regulation of the striking movement can be obtained. This can, however to reiterate, be cut out entirely in order to impact a purely rotary movement to the drilling tool.

As already mentioned, the embodiments described and illustrated are only examples of how the invention can be put into effect and the invention is not restricted thereto. Rather, many other embodiments and modifications are possible. Thus, for example, the cams 7 or the cogs 38 need not always be coordinated with a ring 14 or 39, separate cams or cogs can also be employed which are carried by the housing 3 or 21. Moreover, the number of cams or cogs can be different. It is also possible to give the run-on or lifting surfaces different gradients. Furthermore two cog rings can also cooperate with each other in the example illustrated in FIGS. 1 to 3. Inversely a single cog ring can also cooperate with different shaped run-on or lifting surfaces in the embodiment illustrated in FIGS. 4 to 6.

We claim:

1. A hammer drill comprising, in combination, a motor having a bearing and a drive shaft extending with an end portion thereof through said bearing end; a tubular support fixed at one end thereof to said bearing end of said motor and projecting therefrom substantially coaxially with the drive shaft; a hollow shaft arranged in said tubular support spaced from the inner surface thereof and coaxial with said drive shaft, said hollow shaft being formed intermediate the ends thereof with at least two longitudinally extending slots; coupling means connecting said end portion of said drive shaft with one end of said hollow shaft; anti-friction bearing means between the other end of said tubular support and the other end of said hollow shaft; a striker hammer slidably guided in said hollow shaft for reciprocating movement in longitudinal direction of the latter; spring means in said hollow shaft and engaging said striker hammer and biased to move the latter in a direction toward said other end of said hollow shaft; control means for moving, during rotation of said hollow shaft through a given angle, said striker hammer in a direction toward said one end of the said hollow shaft to stress thereby said spring means and for releasing said striker hammer during further rotation of said hollow shaft so that said striker hammer is driven by said spring means toward said other end of said hollow shaft, said control means comprising a first ring member fastened to said tubular support coaxial therewith and located in the space between the latter and said hollow shaft, a second ring member located in said space, and pins respectively extending through said slots and fastening said second ring member to said striker hammer, said ring members being formed at ends thereof facing each other with saw-toothed shaped projections engaging each other along cam faces extending circumferentially through said given angle and in axial direction through a given height; means for stopping the movement of said striker hammer toward said other end of said hollow shaft at an end position; and adjusting means cooperating with one of said members for adjusting the position thereof in the direction of the axis of said tubular support for varying the stroke of said striker hammer, and said one member being movable through such a distance away from the other member so that said members will not engage each other when said striker hammer is in said end position to stop reciprocation of said striker hammer.

2. A hammer drill as set forth in claim 1, and including a tool bit holder removably connected to said other end of said hollow shaft, said tool bit holder being formed with an axial bore therethrough having an unround portion.

3. A hammer drill as set forth in claim 2, and including a tool bit extending through said axial bore into the interior of said shaft and having an inner end adapted to be engaged by said striker hammer when the latter is in said end position.

4. A hammer drill as set forth in claim 1, wherein said tubular support is formed at said other end thereof with longitudinal extending slots, and wherein said adjusting means includes a setting ring surrounding said tubular support in the region of the other end thereof, pin means extending through said slots in said tubular support and connecting said setting ring with said first ring member, and fixing means to adjustably fix the position of said setting ring at selected distances from said other end of said tubular support.

5. A hammer drill as set forth in claim 4, wherein said tubular support is provided in the region of said other end with an outer screw thread and wherein said fixing means includes a nut threadingly engaging said outer screw thread and abutting against a face of said setting ring facing said other end of said tubular support.

6. A hammer drill as set forth in claim 5 and including a sleeve projecting from said setting ring towards said one end of said tubular support for covering said slots therein.

References Cited by the Examiner

UNITED STATES PATENTS

| | | | |
|---|---|---|---|
| 1,665,173 | 4/1928 | Misener | 173—123 |
| 1,925,289 | 9/1933 | Strobel | 173—123 |
| 2,191,608 | 2/1940 | Coates | 173—119 |
| 2,724,573 | 11/1955 | Lundquist | 173—123 |
| 2,947,180 | 8/1960 | Oros | 173—15 |
| 3,114,423 | 12/1963 | Naslund | 173—97 |

BROUGHTON G. DURHAM, *Primary Examiner.*

D. FAULCONER, L. P. KESSLER, *Assistant Examiners.*